(12) United States Patent
Huang et al.

(10) Patent No.: US 11,812,485 B2
(45) Date of Patent: *Nov. 7, 2023

(54) BLUETOOTH COMMUNICATION METHOD AND TERMINAL

(71) Applicant: Huawei Technologies Co., Ltd., Shenzhen (CN)

(72) Inventors: Kangmin Huang, Shenzhen (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,780

(22) Filed: Aug. 19, 2021

(65) Prior Publication Data
US 2021/0385892 A1 Dec. 9, 2021

Related U.S. Application Data

(63) Continuation of application No. 16/278,222, filed on Feb. 18, 2019, now Pat. No. 11,129,218, which is a
(Continued)

(51) Int. Cl.
*H04W 76/14* (2018.01)
*H04M 1/60* (2006.01)
(Continued)

(52) U.S. Cl.
CPC ......... *H04W 76/14* (2018.02); *H04M 1/6066* (2013.01); *H04M 1/72412* (2021.01);
(Continued)

(58) Field of Classification Search
CPC . H04W 76/14; H04W 56/001; H04W 88/023; H04W 4/80; H04M 1/6066; H04M 2250/02
See application file for complete search history.

(56) References Cited

U.S. PATENT DOCUMENTS

2007/0042712 A1 2/2007 Yuen
2008/0233877 A1 9/2008 Gwee
(Continued)

FOREIGN PATENT DOCUMENTS

CN 1832365 A 9/2006
CN 101119399 A 2/2008
(Continued)

OTHER PUBLICATIONS

Sun yi, "Short distance wireless communication and networking technology," Mar. 2008, 2 pages (abstract).
(Continued)

*Primary Examiner* — Jackie Zuniga Abad
(74) *Attorney, Agent, or Firm* — Conley Rose, P.C.

(57) ABSTRACT

A BLUETOOTH communications method includes receiving a BLUETOOTH-headset communication instruction, wherein a quantity of BLUETOOTH headsets currently to be coupled to the terminal is greater than one; displaying, by a terminal, an information for a user to switch a BLUETOOTH headset working mode to a non-exclusive mode when the BLUETOOTH headset working mode is an exclusive mode; and, simultaneously communicating, by the terminal with all the BLUETOOTH headsets.

20 Claims, 6 Drawing Sheets

Related U.S. Application Data continuation of application No. PCT/CN2016/095836, filed on Aug. 18, 2016.

(51) Int. Cl.
*H04W 4/80* (2018.01)
*H04W 4/00* (2018.01)
*H04M 1/72412* (2021.01)
*H04W 56/00* (2009.01)
*H04W 88/02* (2009.01)
*H04W 8/00* (2009.01)
*H04B 1/3827* (2015.01)

(52) U.S. Cl.
CPC ............... *H04W 4/00* (2013.01); *H04W 4/80* (2018.02); *H04W 56/001* (2013.01); *H04W 88/023* (2013.01); *H04B 2001/3866* (2013.01); *H04M 2250/02* (2013.01); *H04W 8/005* (2013.01)

(56) References Cited

U.S. PATENT DOCUMENTS

| | | | |
|---|---|---|---|
| 2009/0061775 A1* | 3/2009 | Warren | H04L 67/12 455/41.2 |
| 2012/0202425 A1 | 8/2012 | Glezerman et al. | |
| 2014/0119407 A1 | 5/2014 | Miller | |
| 2014/0141723 A1 | 5/2014 | Wang et al. | |
| 2015/0072666 A1 | 3/2015 | Lai | |
| 2015/0105022 A1 | 4/2015 | Jung | |
| 2015/0359022 A1 | 12/2015 | Lau et al. | |
| 2016/0330306 A1* | 11/2016 | Dong | H04M 1/72412 |
| 2019/0037173 A1* | 1/2019 | Lee | G06F 3/04842 |

FOREIGN PATENT DOCUMENTS

| | | |
|---|---|---|
| CN | 101645717 A | 2/2010 |
| CN | 101909107 A | 12/2010 |
| CN | 103475775 A | 12/2013 |
| CN | 103701000 A | 4/2014 |
| CN | 103986818 A | 8/2014 |
| CN | 104426582 A | 3/2015 |
| CN | 104822127 A | 8/2015 |
| CN | 105101058 A | 11/2015 |
| CN | 105208511 A | 12/2015 |
| CN | 105634561 A | 6/2016 |
| EP | 1372299 A1 | 12/2003 |
| EP | 1962457 A1 | 8/2008 |
| EP | 1962481 A1 | 8/2008 |

OTHER PUBLICATIONS

Zhou Yu, "The Application of Electric Vehicle Lithium Batteries Management System Based on Smart Phone," 2015, 2 ages (abstract).
Wei Youfa, "Research and Design of LED Lighting Controller Based on Android," 2015, 2 pages (abstract).

* cited by examiner

BLUETOOTH COMMUNICATION METHOD AND TERMINAL

CROSS-REFERENCE TO RELATED APPLICATIONS

This is a continuation of U.S. patent application Ser. No. 16/278,222 filed on Feb. 18, 2019, which is a continuation of International Patent Application No. PCT/CN2016/095836 filed on Aug. 18, 2016. All of the aforementioned patent applications are hereby incorporated by reference in their entireties.

TECHNICAL FIELD

The present disclosure relates to the field of communications technologies, and in particular, to a BLUETOOTH communication method and a terminal.

BACKGROUND

As terminals such as a mobile phone and a tablet computer are intelligently developed, people's life, work, study, and entertainment may be greatly helped. An existing terminal generally has a BLUETOOTH communication function. A BLUETOOTH technology is a short-range wireless communications technology. Based on a short-range wireless connection with low costs, the BLUETOOTH technology replaces a cable connection disposed between a digital device and a computer or a mobile phone peripheral such that wireless networking between digital devices can be implemented. At present, the BLUETOOTH technology is widely applied to a BLUETOOTH headset, in-vehicle handsfree BLUETOOTH, and the like. In recent years, many applications that support the BLUETOOTH headset emerge, greatly facilitating a user of the terminal. For example, a wireless telephone call may be implemented such that the user does not need to hold the terminal in hand, thereby reducing burden of the user, and reducing radiation caused by the mobile phone to the user's brain. For another example, stereophonic music can be played using BLUETOOTH headset, and in comparison with a conventional wired headset, occupied space is reduced and inconvenience that is caused by an audio line to the user is removed.

However, in an actual use process, an existing terminal can generally connect to only one BLUETOOTH headset for communication, and the user cannot play music or answer a call using two or more BLUETOOTH headsets. Consequently, the user's requirement for simultaneously communicating with the terminal using more than one BLUETOOTH headset cannot be met.

SUMMARY

A technical problem to be resolved in embodiments of the present disclosure is to provide a BLUETOOTH communication method and a terminal such that the terminal can simultaneously communicate with more than one BLUETOOTH headset.

According to a first aspect, an embodiment of the present disclosure provides a BLUETOOTH communication method, including, when a user uses a terminal to perform audio transmission to a BLUETOOTH headset, receiving a multi-BLUETOOTH-headset communication instruction entered by the user, determining whether a quantity of BLUETOOTH headsets currently connected to the terminal is greater than 1, if the quantity of BLUETOOTH headsets currently connected to the terminal is greater than 1, reading a BLUETOOTH headset working mode selected by the user, where the BLUETOOTH headset working mode includes an exclusive mode and a non-exclusive mode, and if the user selects the exclusive mode, creating, by the terminal, a headset tag object for a specified BLUETOOTH headset, establishing a communications link with the specified BLUETOOTH headset, and communicating with the specified BLUETOOTH headset using BLUETOOTH, or if the user selects the non-exclusive mode, separately creating, by the terminal, a headset tag object for all BLUETOOTH headsets, separately establishing a communications link with all the BLUETOOTH headsets, and simultaneously communicating, using BLUETOOTH, with more than one BLUETOOTH headset selected by the user, or simultaneously communicating, using BLUETOOTH, with all the BLUETOOTH headsets with which the communications link is established, where the headset tag object includes information used to establish the communications link with the terminal.

According to the method, the terminal can accept association requests of at least two BLUETOOTH headset devices. When needing to perform BLUETOOTH communication, the terminal can simultaneously communicate with at least two BLUETOOTH headsets according to a user requirement such that a function and applicability of the terminal are expanded, use experience of the user is improved, and one or more users can use the terminal and multiple BLUETOOTH headsets according to a requirement of the one or more users.

With reference to the first aspect, in a first possible implementation of the first aspect, when the terminal establishes the communications link with the BLUETOOTH headset, the method includes sending a reference COM model connection request to the BLUETOOTH headset, receiving a response message returned by the BLUETOOTH headset, and establishing a reference COM model connection to the BLUETOOTH headset according to the response message, and sending, to the connected BLUETOOTH headset, a request for establishing a synchronous connection-oriented link, and establishing the synchronous connection-oriented link with the connected BLUETOOTH headset.

According to the foregoing communications link establishment procedure, the communications link may be separately established with two or more BLUETOOTH headsets such that the two or more BLUETOOTH headsets can be simultaneously used to communicate with the terminal according to a user requirement.

With reference to the first aspect, in a second possible implementation of the first aspect, before determining whether a quantity of BLUETOOTH headsets currently connected to the terminal is greater than 1, the method further includes determining that there is a matched BLUETOOTH headset currently.

When there is no matched BLUETOOTH headset, a loudspeaker may be used to play sound in order to ensure normal implementation of a call function and a music playing function.

With reference to the second possible implementation of the first aspect, in a third possible implementation of the first aspect, the method further includes, if one BLUETOOTH headset is currently connected to the terminal, creating a headset tag object for the BLUETOOTH headset, establishing a communications link with the BLUETOOTH headset, and communicating with the BLUETOOTH headset using BLUETOOTH.

When only one BLUETOOTH headset is connected to the terminal, the headset tag object is directly created for the BLUETOOTH headset, and the communications link is directly established with the BLUETOOTH headset such that BLUETOOTH communication can be normally performed.

With reference to any one of the first aspect, or the first to the third possible implementations of the first aspect, in a fourth possible implementation of the first aspect, the method further includes, when the user uses the terminal to perform audio transmission to the BLUETOOTH headset, if a new BLUETOOTH headset is connected, prompting the user to choose whether to switch to the new BLUETOOTH headset to perform audio transmission, or when a current BLUETOOTH headset working mode is the exclusive mode, prompting the user to choose whether to switch the BLUETOOTH headset working mode, and if the user chooses to switch to the non-exclusive mode, further prompting the user to select BLUETOOTH headsets that simultaneously perform audio transmission.

By means of prompting, a multi-headset communication mode may be fully applied to different scenarIOS such that applicability and intelligence of the terminal are increased.

With reference to any one of the first aspect, or the first to the third possible implementations of the first aspect, in a fifth possible implementation of the first aspect, the method further includes, if the user receives an incoming call when using the terminal to perform non-incoming call audio transmission to the BLUETOOTH headset, prompting the user to select at least one BLUETOOTH headset to answer the call.

By means of prompting, the multi-headset communication mode may be fully applied to a scenario in which an incoming call is received when music is played such that applicability and intelligence of the terminal are increased.

According to a second aspect, an embodiment of the present disclosure provides a terminal, including a receiving unit configured to, when a user uses the terminal to perform audio transmission to a BLUETOOTH headset, receive a multi-BLUETOOTH-headset communication instruction entered by the user, a determining unit configured to determine whether a quantity of BLUETOOTH headsets currently connected to the terminal is greater than 1, a reading unit configured to if the quantity of BLUETOOTH headsets currently connected to the terminal is greater than 1, read a BLUETOOTH headset working mode selected by the user, where the BLUETOOTH headset working mode includes an exclusive mode and a non-exclusive mode, and a communications unit configured to if the user selects the exclusive mode, create a headset tag object for a specified BLUETOOTH headset, establish a communications link with the specified BLUETOOTH headset, and communicate with the specified BLUETOOTH headset using BLUETOOTH, or if the user selects the non-exclusive mode, separately create a headset tag object for all BLUETOOTH headsets, separately establish a communications link with all the BLUETOOTH headsets, and simultaneously communicate, using BLUETOOTH, with more than one BLUETOOTH headset selected by the user, or simultaneously communicate, using BLUETOOTH, with all the BLUETOOTH headsets with which the communications link is established, where the headset tag object includes information used to establish the communications link with the terminal.

With reference to the second aspect, in a first possible implementation of the second aspect, when the terminal establishes the communications link with the BLUETOOTH headset, the communications unit is further configured to send a reference COM model connection request to the BLUETOOTH headset, receive a response message returned by the BLUETOOTH headset, and establish a reference COM model connection to the BLUETOOTH headset according to the response message, and send, to the connected BLUETOOTH headset, a request for establishing a synchronous connection-oriented link, and establish the synchronous connection-oriented link with the connected BLUETOOTH headset.

With reference to the second aspect, in a second possible implementation of the second aspect, the determining unit is further configured to determine that there is a matched BLUETOOTH headset currently.

With reference to the second possible implementation of the second aspect, in a third possible implementation of the second aspect, the communications unit is further configured to if one BLUETOOTH headset is currently connected to the terminal, create a headset tag object for the BLUETOOTH headset, establish a communications link with the BLUETOOTH headset, and communicate with the BLUETOOTH headset using BLUETOOTH.

With reference to any one of the second aspect, or the first to the third possible implementations of the second aspect, in a fourth possible implementation of the second aspect, the terminal further includes a prompting unit configured to, when the user uses the terminal to perform audio transmission to the BLUETOOTH headset, if a new BLUETOOTH headset is connected, prompt the user to choose whether to switch to the new BLUETOOTH headset to perform audio transmission, or when a current BLUETOOTH headset working mode is the exclusive mode, prompt the user to choose whether to switch the BLUETOOTH headset working mode, and if the user chooses to switch to the non-exclusive mode, further prompt the user to select BLUETOOTH headsets that simultaneously perform audio transmission.

With reference to any one of the second aspect, or the first to the third possible implementations of the second aspect, in a fifth possible implementation of the second aspect, the terminal further includes a prompting unit configured to if the user receives an incoming call when using the terminal to perform non-incoming call audio transmission to the BLUETOOTH headset, prompt the user to select at least one BLUETOOTH headset to answer the call.

According to a third aspect, an embodiment of the present disclosure provides a terminal, including a processor, a memory, an interface circuit, a wireless BLUETOOTH transceiver, a display, a loudspeaker, and a bus, where the processor, the memory, the interface circuit, the wireless BLUETOOTH transceiver, the display, and the loudspeaker are connected and communicate with each other using the bus, the wireless BLUETOOTH transceiver is configured to communicate with a BLUETOOTH headset using BLUETOOTH, the display is used for human computer interaction, and is configured to prompt a user to enter a selection instruction, the loudspeaker is configured to play sound, the memory is configured to store a set of program code, and the processor is configured to invoke the program code stored in the memory in order to perform the following operations when the user uses the terminal to perform audio transmission to the BLUETOOTH headset, receiving, using the display and the interface circuit, a multi-BLUETOOTH-headset communication instruction entered by the user, determining whether a quantity of BLUETOOTH headsets currently connected to the terminal is greater than 1, if the quantity of BLUETOOTH headsets currently connected to the terminal is greater than 1, reading a BLUETOOTH headset working mode selected by the user, where the BLUETOOTH headset working mode includes an exclusive mode and a non-exclusive mode, and if the user selects the exclusive mode, creating, by the processor, a headset tag object for a specified BLUETOOTH headset, establishing a communications link with the specified BLUETOOTH headset using the wireless BLUETOOTH transceiver, and communicating with the specified BLUETOOTH headset using BLUETOOTH, or if the user selects the non-exclusive mode, separately creating, by the processor, a headset tag object for all BLUETOOTH headsets, separately establishing a communications link with all the BLUETOOTH headsets using the wireless BLUETOOTH transceiver, and simultaneously communicating, using BLUETOOTH, with more than one BLUETOOTH headset selected by the user, or communicating, using BLUETOOTH, with all the BLUETOOTH headsets with which the communications link is established, where the headset tag object includes information used to establish the communications link with the terminal.

With reference to the third aspect, in a first possible implementation of the third aspect, when the terminal establishes the communications link with the BLUETOOTH headset, the processor is further configured to send a reference COM model connection request to the BLUETOOTH headset using the interface circuit, receive a response message returned by the BLUETOOTH headset, and establish a reference COM model connection to the BLUETOOTH headset according to the response message, and send, to the connected BLUETOOTH headset, a request for establishing a synchronous connection-oriented link, and establish the synchronous connection-oriented link with the connected BLUETOOTH headset.

With reference to the third aspect, in a second possible implementation of the third aspect, the processor is further configured to determine that there is a matched BLUETOOTH headset currently.

With reference to the second possible implementation of the third aspect, in a third possible implementation of the third aspect, if one BLUETOOTH headset is currently connected to the terminal, the processor is configured to create a headset tag object for the BLUETOOTH headset, establish a communications link with the BLUETOOTH headset using the wireless BLUETOOTH transceiver, and communicate with the BLUETOOTH headset using BLUETOOTH.

With reference to any one of the third aspect, or the first to the third possible implementations of the third aspect, in a fourth possible implementation of the third aspect, when the user uses the terminal to perform audio transmission to the BLUETOOTH headset, if a new BLUETOOTH headset is connected, the processor is configured to instruct the display to display prompt information in order to prompt the user to choose whether to switch to the new BLUETOOTH headset to perform audio transmission, or when a current BLUETOOTH headset working mode is the exclusive mode, prompt the user to choose whether to switch the BLUETOOTH headset working mode, and if the user chooses to switch to the non-exclusive mode, further prompt the user to select BLUETOOTH headsets that simultaneously perform audio transmission.

With reference to any one of the third aspect, or the first to the third possible implementations of the third aspect, in a fifth possible implementation of the third aspect, if the user receives an incoming call when using the terminal to perform non-incoming call audio transmission to the BLUETOOTH headset, the processor is configured to instruct the display to display prompt information in order to prompt the user to select at least one BLUETOOTH headset to answer the call.

According to a fourth aspect, an embodiment of the present disclosure provides a computer storage medium, where the computer storage medium includes a set of program code, which is used to perform the method according to any implementation of the first aspect in the embodiments of the present disclosure.

BRIEF DESCRIPTION OF DRAWINGS

To describe the technical solutions in some of the embodiments of the present disclosure more clearly, the following briefly describes the accompanying drawings describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
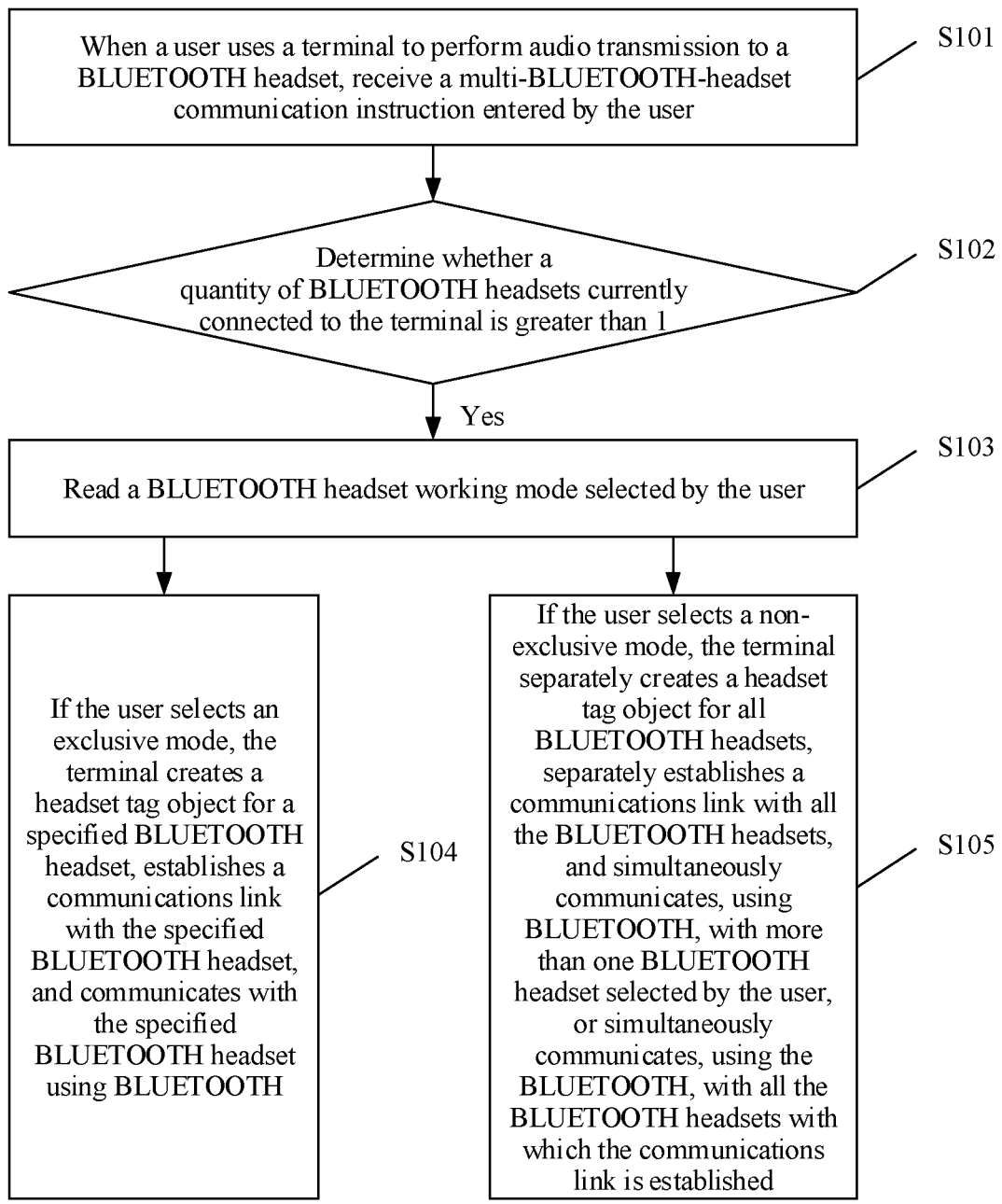
FIG. 1 is a schematic flowchart of a first embodiment of a BLUETOOTH communication method according to the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and the foregoing drawings in the present disclosure, the terms "include", "contain" and any other variants mean to cover the non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A terminal in embodiments of the present disclosure may include a smartphone (such as an ANDROID mobile phone, an IOS mobile phone, or a WINDOWS Phone mobile phone), a tablet computer, a palmtop computer, a notebook computer, a mobile Internet device (MID), or a wearable device. The foregoing terminals are merely examples that are not exhaustive, and the terminal includes but is not limited to the foregoing terminals. A BLUETOOTH communications module is disposed on the terminal, and may communicate with a BLUETOOTH headset using BLUETOOTH, including calling, music playing, and the like. This is not limited in the embodiments of the present disclosure.

The BLUETOOTH headset in the embodiments of the present disclosure may be a BLUETOOTH monaural headset or a BLUETOOTH stereo headset. This is also not limited in the embodiments of the present disclosure.

The present disclosure mainly relates to an improvement in aspects of BLUETOOTH communication and BLUETOOTH management in the terminal. A link in a BLUETOOTH module and management of a relationship between BLUETOOTH devices are optimized such that an existing terminal can support simultaneous association between the terminal and multiple BLUETOOTH headsets. An ANDROID system is used as an example. In an ANDROID system architecture, an ANDROID.BLUETOOTH package is a main software module that relates to management of a BLUETOOTH protocol, a BLUETOOTH device, and association. A BLUETOOTHAdapter class represents a local BLUETOOTH adapter, and a BLUETOOTHDevice class represents a remote BLUETOOTH device. After a BLUETOOTH headset matches the terminal, the terminal records a headset status in a BLUETOOTHDevice module, queries, using a Service Discovery Protocol (SDP) service, a service that the headset can provide, and records this service type in the headset status. After the BLUETOOTH headset is registered, if a synchronous connection-oriented (SCO) link needs to be established for an application program in the terminal, the terminal may obtain a correct headset status according to a record in the BLUETOOTHDevice class. The BLUETOOTHDevice is created as a BLUETOOTH controller is started. BLUETOOTH communication and BLUETOOTH management in another operating system are similar to those in the ANDROID system. A terminal in the other operating system also needs to store status information of some BLUETOOTH headsets in order to match and manage the BLUETOOTH headsets, and so on. The following describes a BLUETOOTH communication method of the present disclosure in detail with reference to specific embodiments.

Referring to FIG. 1, FIG. 1 is a schematic flowchart of a first embodiment of a BLUETOOTH communication method according to the present disclosure. In this embodiment, the method includes the following steps.

S101. When a user uses a terminal to perform audio transmission to a BLUETOOTH headset, receive a multi-BLUETOOTH-headset communication instruction entered by the user.

Optionally, the terminal may perform audio transmission to the BLUETOOTH headset when a system application of the terminal is executed. The system application may include but is not limited to a call application, a voice mailbox application, a voice recording application, a music playing application, a video playing application, and the like that are embedded in a system. Alternatively, the terminal may perform audio transmission to the BLUETOOTH headset when another third-party application is executed. The third-party application may include but is not limited to an audio-visual application, such as a common music playing application, a video playing application that includes audio, a broadcast listening application, and an ebook voice playing application. The third-party application may further include a common instant messaging application, which has a voice chat function or a video chat function. In conclusion, when the user performs, using the terminal and the BLUETOOTH headset, an application that includes audio transmission, multi-BLUETOOTH communication may be performed using the method in this embodiment.

The multi-BLUETOOTH-headset communication instruction may be entered on a BLUETOOTH setting interface, or may be configured as an option for the user to select. Alternatively, the multi-BLUETOOTH-headset communication instruction may be entered on a display interface of any application, such as a display interface of a music playing application or a call interface. This is not limited in this embodiment of the present disclosure.

S102. Determine whether a quantity of BLUETOOTH headsets currently connected to the terminal is greater than 1. If the quantity of BLUETOOTH headsets currently connected to the terminal is greater than 1, perform step S103.

S103. Read a BLUETOOTH headset working mode selected by the user.

The BLUETOOTH headset working mode includes an exclusive mode and a non-exclusive mode. In the exclusive mode, only one BLUETOOTH headset works, and cooperates with the terminal to perform BLUETOOTH communication such as calling or music playing. In the non-exclusive mode, two or more BLUETOOTH headsets may work, and cooperate with the terminal to perform BLUETOOTH communication.

S104. If the user selects an exclusive mode, the terminal creates a headset tag (Headset Base) object for a specified BLUETOOTH headset, establishes a communications link with the specified BLUETOOTH headset, and communicates with the specified BLUETOOTH headset using BLUETOOTH.

The specified BLUETOOTH headset is a BLUETOOTH headset selected by the user, a BLUETOOTH headset preset by the user, or a latest BLUETOOTH headset matched with the terminal.

S105. If the user selects a non-exclusive mode, the terminal separately creates a headset tag object for all BLUETOOTH headsets, separately establishes a communications link with all the BLUETOOTH headsets, and simultaneously communicates, using BLUETOOTH, with more than one BLUETOOTH headset selected by the user, or simultaneously communicates, using BLUETOOTH, with all the BLUETOOTH headsets with which the communications link is established.

The headset tag object includes information used to establish the communications link with the terminal, such as address information of the BLUETOOTH headset, a service that the BLUETOOTH headset can provide, or the like. The information may be used to implement a main function of headset communication (for example, to implement a function of establishing and releasing the communications link, or adjusting a volume).

It should be noted that, because BLUETOOTH communication attaches great importance to a security problem, the terminal first needs to match a BLUETOOTH headset when needing to communicate with the BLUETOOTH headset. Only when the matching succeeds, communication between BLUETOOTH devices can be performed. In addition, mutual transmission in BLUETOOTH communication is performed based on a unique Media Access Control address. An ANDROID system is still used as an example. First, according to a quantity of BLUETOOTH headsets selected by the user, multiple BLUETOOTHDevice classes (collectively referred to as the headset tag object in this embodiment of the present disclosure) need to be created using a getRemoteDevice(String) method provided on an ANDROID platform. Actually, the class is simple encapsulation of a BLUETOOTH hardware address. The class is operated in a remote BLUETOOTH hardware address, and a BLUETOOTH device may be created using a BLUETOOTH adapter. Therefore, the terminal cannot communicate with the BLUETOOTH headset using BLUETOOTH after connected to the BLUETOOTH headset. Only after creating the headset tag object and establishing the communications link, the terminal can communicate with the BLUETOOTH headset using BLUETOOTH.

Further, a communications link establishment process is as follows

If the terminal serves as a primary device, the terminal needs to initiate a reference COM model (RFCOMM) connection to a device in a selected BLUETOOTH address, such as the BLUETOOTH headset.

When the BLUETOOTH headset serves as a secondary device and receives the connection initiated by the terminal, the terminal may send a ringing command. When receiving a ringing instruction, the BLUETOOTH headset generates a ringing tone. In this case, the user may press a Talk key to agree to establish the connection. The terminal receives a response message returned by the BLUETOOTH headset, and establishes the reference COM model connection to the BLUETOOTH headset.

After the RFCOMM connection is established, the terminal further initiates a request for establishing an SCO link. When receiving an instruction message of establishing a SCO connection, the BLUETOOTH headset sets a BLUETOOTH headset voice group such that a SCO communications link is established. In this case, BLUETOOTH communication between the BLUETOOTH headset and the terminal can be performed.

In addition, BLUETOOTH wireless communications hardware provides two different types of physical links, that is, an SCO link and an asynchronous connection-less (ACL) link. Therefore, which type of link needs to be created is selected according to a service that the user needs to generate. SCO is connection-oriented, and therefore is more applicable to a service such as a voice call. However, ACL may also be used to transmit a voice, but transmit the voice in a data form. This embodiment is designed mainly for transmitting a voice using a BLUETOOTH headset. Therefore, after the terminal matches the BLUETOOTH headset, software corresponding to a terminal operating system chooses to separately establish a SCO link with two or more BLUETOOTH headsets. In the ANDROID system, after the BLUETOOTH headset is matched, a headset status is recorded in a BLUETOOTHDevice class, a service that the headset can provide is queried using an SDP service, and this service type is recorded in the headset status. After the BLUETOOTH headset is registered, if a SCO link needs to be established for an application program in the terminal, a correct status may be obtained according to a record in the BLUETOOTHDevice class.

In this embodiment, when the user uses the terminal to perform audio transmission to the BLUETOOTH headset, a multi-headset communication mode of the terminal is enabled by receiving the multi-BLUETOOTH-headset communication instruction entered by the user, and then whether the quantity of BLUETOOTH headsets currently connected to the terminal is greater than 1 is determined. If the quantity of BLUETOOTH headsets currently connected to the terminal is greater than 1, the BLUETOOTH headset working mode selected by the user is read. If the user selects the exclusive mode, the terminal creates the headset tag object for the specified BLUETOOTH headset, establishes the communications link with the specified BLUETOOTH headset, and communicates with the specified BLUETOOTH headset using BLUETOOTH. Alternatively, if the user selects the non-exclusive mode, the terminal separately creates the headset tag object for all the BLUETOOTH headsets, separately establishes the communications link with all the BLUETOOTH headsets, and simultaneously communicates, using BLUETOOTH, with the more than one BLUETOOTH headset selected by the user, or simultaneously communicates, using BLUETOOTH, with all the BLUETOOTH headsets with which the communications link is established. Therefore, the terminal can accept association requests of at least two BLUETOOTH headset devices. When needing to perform BLUETOOTH communication, the terminal can simultaneously communicate with at least two BLUETOOTH headsets according to a user requirement such that a function and applicability of the terminal are expanded, use experience of the user is improved, and one or more users can use the terminal and multiple BLUETOOTH headsets according to a requirement of the one or more users.

Figure 2:
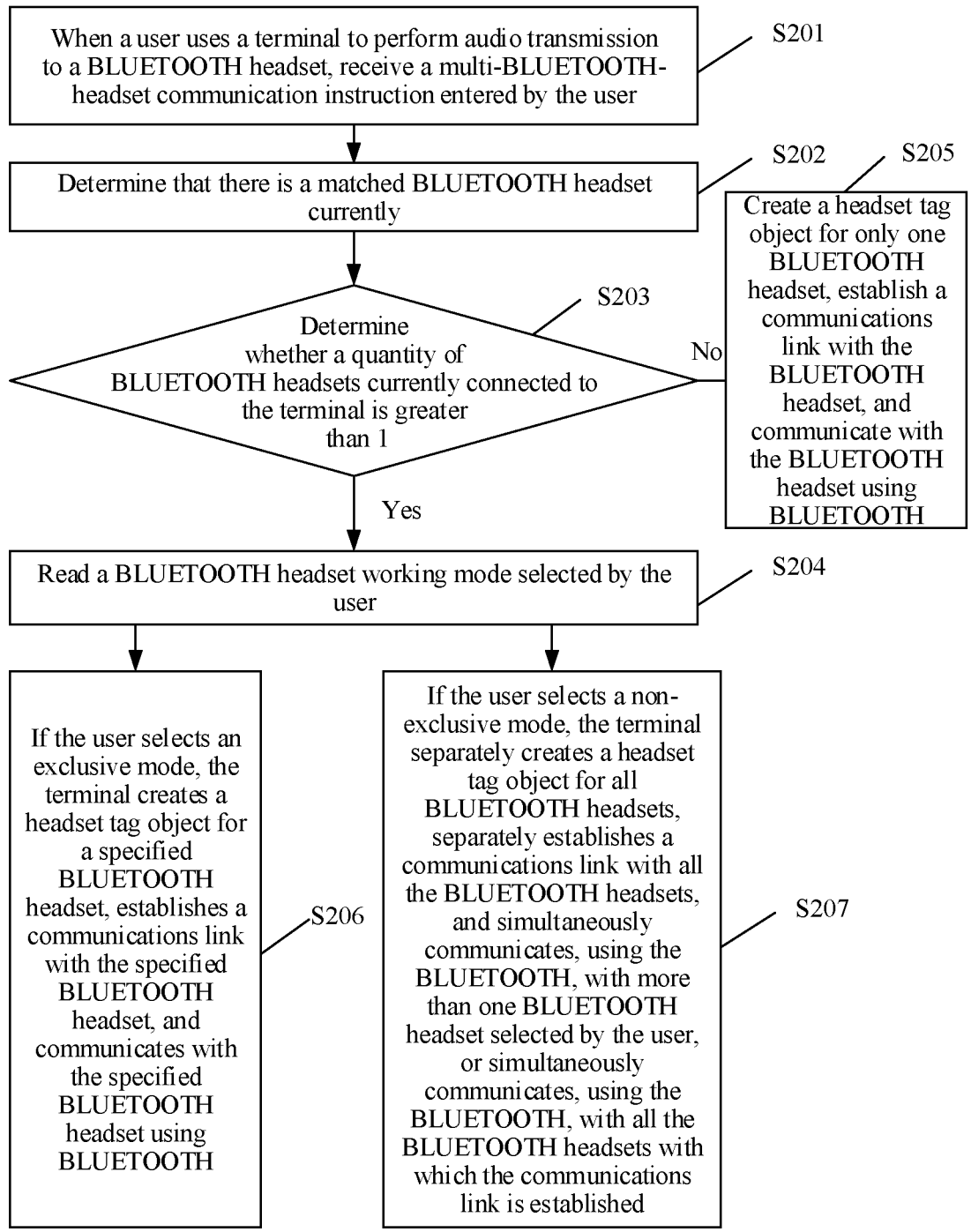
FIG. 2 is a schematic flowchart of a second embodiment of a BLUETOOTH communication method according to the present disclosure.

Referring to FIG. 2, FIG. 2 is a schematic flowchart of a second embodiment of a BLUETOOTH communication method according to the present disclosure. In this embodiment, the method includes the following steps.

S201. When a user uses a terminal to perform audio transmission to a BLUETOOTH headset, receive a multi-BLUETOOTH-headset communication instruction entered by the user.

S202. Determine that there is a matched BLUETOOTH headset currently.

Optionally, the terminal may determine whether there is the matched BLUETOOTH headset currently.

If there is the matched BLUETOOTH headset, step S203 is performed. Alternatively, if there is no matched BLUETOOTH headset, audio transmission may be completed using a loudspeaker to play audio or using a microphone to pick up audio. That is, in this case, there is no BLUETOOTH headset matched with the terminal. Although choosing to use a multi-headset communication mode, the user can only use the microphone and/or the loudspeaker to ensure normal implementation of a terminal call or a music playing function because there is no matched headset. Certainly, to improve privacy, a mute voice may also be configured in this case. This is not limited in this embodiment of the present disclosure.

Optionally, an ANDROID system is used as an example. The terminal may determine, by accessing information about a connected BLUETOOTH device quantity in a BLUETOOTH device service module, whether the terminal has a matched BLUETOOTH headset. Only after a BLUETOOTH headset is matched, a connection can be established.

S203. Determine whether a quantity of BLUETOOTH headsets currently connected to the terminal is greater than 1. If the quantity of BLUETOOTH headsets currently connected to the terminal is greater than 1, perform step S204, or if the quantity of BLUETOOTH headsets currently connected to the terminal is not greater than 1, perform step S205.

S204. Read a BLUETOOTH headset working mode selected by the user.

The BLUETOOTH headset working mode includes an exclusive mode and a non-exclusive mode.

S205. Create a headset tag object for only one BLUETOOTH headset, establish a communications link with the BLUETOOTH headset, and communicate with the BLUETOOTH headset using BLUETOOTH. That is, when only one BLUETOOTH headset is currently connected to the terminal, to normally perform BLUETOOTH communication, the terminal may directly create the headset tag object for the headset, establish the communications link with the headset, and communicate with the headset using BLUETOOTH.

S206. If the user selects an exclusive mode, the terminal creates a headset tag object for a specified BLUETOOTH headset, establishes a communications link with the specified BLUETOOTH headset, and communicates with the specified BLUETOOTH headset using BLUETOOTH.

S207. If the user selects a non-exclusive mode, the terminal separately creates a headset tag object for all BLUETOOTH headsets, separately establishes a communications link with all the BLUETOOTH headsets, and simultaneously communicates with more than one BLUETOOTH headset selected by the user, or simultaneously communicates, using BLUETOOTH, with all the BLUETOOTH headsets with which the communications link is established.

The headset tag object includes information used to establish the communications link with the terminal.

In this embodiment, a processing policy is added for a case in which matched or connected headsets are not sufficient. When there is no matched headset, the loudspeaker is used to play sound, or the microphone is used to pick up sound. When there is only one connected BLUETOOTH headset, the communications link is directly established with the headset for BLUETOOTH communication such that applicability of the terminal is increased, and a call and music playing can be normally performed.

Figure 3A:
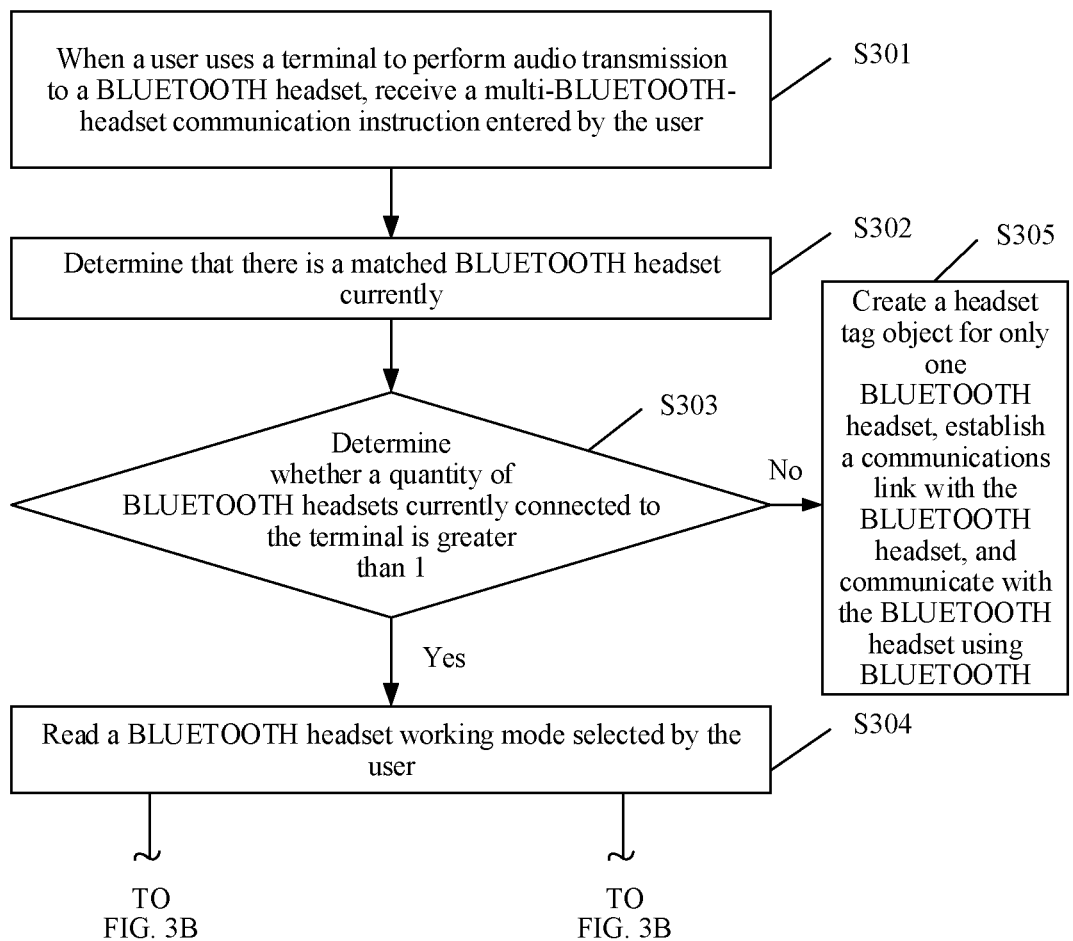
FIG. 3A and FIG. 3B are a schematic flowchart of a third embodiment of a BLUETOOTH communication method according to the present disclosure.
Figure 3B:
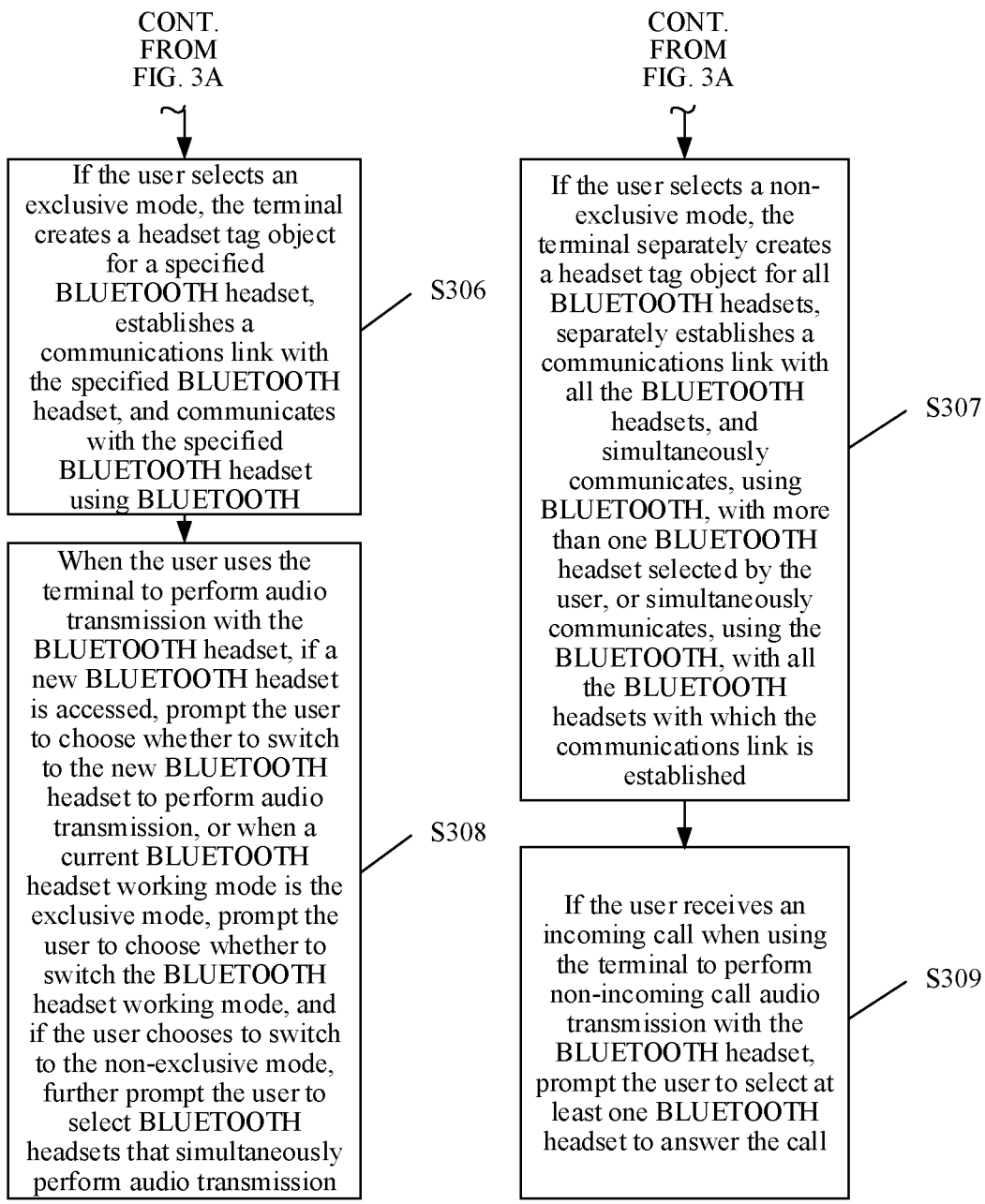

Referring to FIG. 3A and FIG. 3B, FIG. 3A and FIG. 3B are a schematic flowchart of a third embodiment of a BLUETOOTH communication method according to the present disclosure. In this embodiment, steps S301 to S307 are the same as steps S201 to S207. Details are not described herein again. For different scenarIOS, the method further includes the following steps.

S308. When the user uses the terminal to perform audio transmission to the BLUETOOTH headset, if a new BLUETOOTH headset is connected, prompt the user to choose whether to switch to the new BLUETOOTH headset to perform audio transmission, or when a current BLUETOOTH headset working mode is the exclusive mode, prompt the user to choose whether to switch the BLUETOOTH headset working mode, and if the user chooses to switch to the non-exclusive mode, further prompt the user to select BLUETOOTH headsets that simultaneously perform audio transmission.

If the user chooses to switch to the new BLUETOOTH headset to perform audio transmission, the BLUETOOTH headset that previously performs audio transmission is turned off. If the user switches to the non-exclusive mode, audio transmission is performed using a BLUETOOTH headset selected by the user. Step S308 is more applicable to a scenario that is previously in the exclusive mode. Certainly, in a scenario in the non-exclusive mode, when a new BLUETOOTH headset is connected, the new BLUETOOTH headset may be directly activated and used in the non-exclusive mode, or the exclusive mode may be directly switched to, and only the new BLUETOOTH headset is used. This is not limited in this embodiment of the present disclosure.

S309. If the user receives an incoming call when using the terminal to perform non-incoming call audio transmission to the BLUETOOTH headset, prompt the user to select at least one BLUETOOTH headset to answer the call.

Step S309 is more applicable to a scenario that is previously in the non-exclusive mode. Certainly, in a scenario in the exclusive mode, a call is generally more important than non-incoming call audio transmission. In this case, the BLUETOOTH headset may be directly switched from the non-incoming call audio transmission to the call, and after the call ends, the non-incoming call audio transmission is restored.

This embodiment further describes policies of using a multi-BLUETOOTH communication mode in various scenarIOS. Different requirements of the user may be fully met by means of user selection prompting and responding such that applicability and intelligence of the terminal are increased, and use experience of the user is improved.

Figure 4:
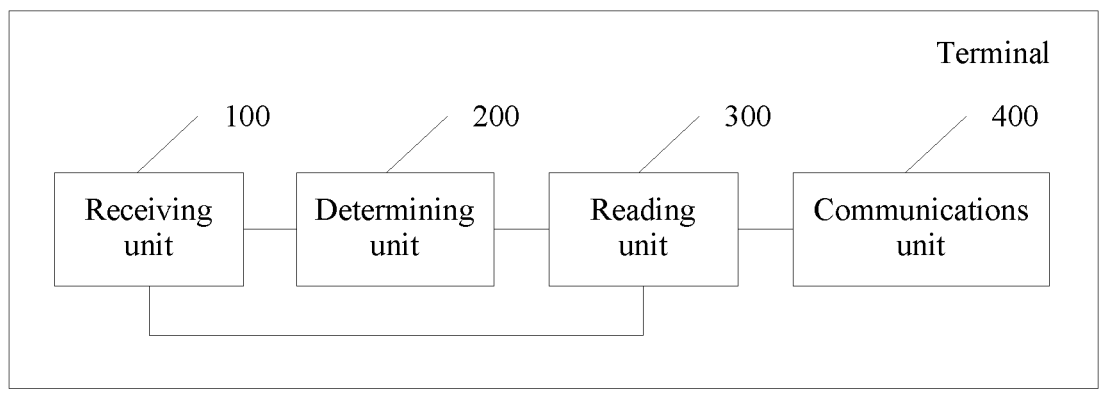
FIG. 4 is a schematic diagram of composition of a first embodiment of a terminal according to the present disclosure.

Referring to FIG. 4, FIG. 4 is a schematic diagram of composition of a terminal according to an embodiment of the present disclosure. In this embodiment, the terminal includes a receiving unit 100 configured to when a user uses the terminal to perform audio transmission to a BLUETOOTH headset, receive a multi-BLUETOOTH-headset communication instruction entered by the user, a determining unit 200 configured to determine whether a quantity of BLUETOOTH headsets currently connected to the terminal is greater than 1, a reading unit 300 configured to if the quantity of BLUETOOTH headsets currently connected to the terminal is greater than 1, read a BLUETOOTH headset working mode selected by the user, where the BLUETOOTH headset working mode includes an exclusive mode and a non-exclusive mode, and a communications unit 400 configured to if the user selects the exclusive mode, create a headset tag object for a specified BLUETOOTH headset, establish a communications link with the specified BLUETOOTH headset, and communicate with the specified BLUETOOTH headset using BLUETOOTH, or if the user selects the non-exclusive mode, separately create a headset tag object for all BLUETOOTH headsets, separately establish a communications link with all the BLUETOOTH headsets, and simultaneously communicate, using BLUETOOTH, with more than one BLUETOOTH headset selected by the user, or simultaneously communicate, using BLUETOOTH, with all the BLUETOOTH headsets with which the communications link is established.

The headset tag object includes information used to establish the communications link with the terminal.

Optionally, when the terminal establishes the communications link with the BLUETOOTH headset, the communications unit 400 is further configured to send a reference COM model connection request to the BLUETOOTH headset, receive a response message returned by the BLUETOOTH headset, and establish a reference COM model connection to the BLUETOOTH headset according to the response message, and send, to the connected BLUETOOTH headset, a request for establishing a synchronous connection-oriented link, and establish the synchronous connection-oriented link with the connected BLUETOOTH headset.

Optionally, the determining unit 200 is further configured to determine that there is a matched BLUETOOTH headset currently.

Further, the determining unit 200 may determine whether there is the matched BLUETOOTH headset currently.

If there is no matched BLUETOOTH headset, the communications unit 400 is further configured to perform audio transmission using a loudspeaker and/or a microphone.

Alternatively, if there is the matched BLUETOOTH headset, a step of the determining whether a quantity of BLUETOOTH headsets currently connected to the terminal is greater than 1 is performed.

Optionally, the communications unit 400 is further configured to if one BLUETOOTH headset is currently connected to the terminal, create a headset tag object for the BLUETOOTH headset, establish a communications link with the BLUETOOTH headset, and communicate with the BLUETOOTH headset using BLUETOOTH.

Figure 5:
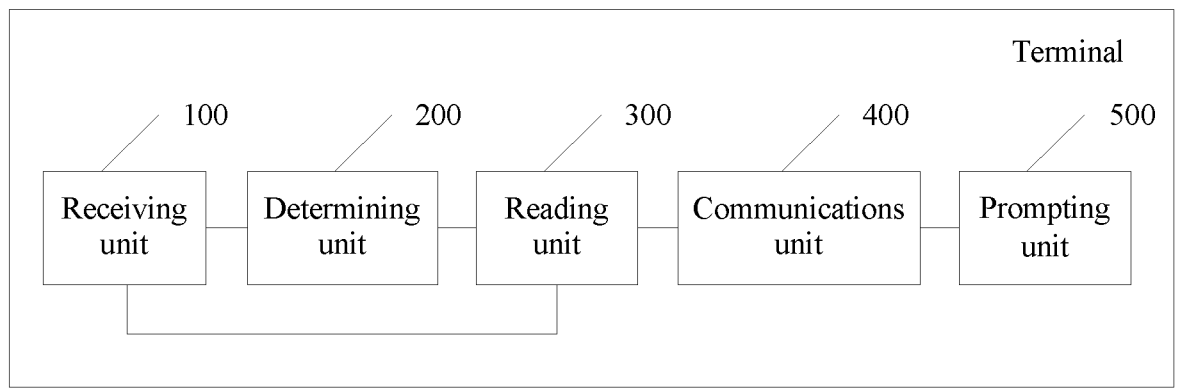
FIG. 5 is a schematic diagram of composition of a second embodiment of a terminal according to the present disclosure.

Referring to FIG. 5, FIG. 5 is a schematic diagram of composition of another terminal according to an embodiment of the present disclosure. In this embodiment of the present disclosure, in comparison with the embodiment shown in FIG. 4, the terminal further includes a prompting unit 500 configured to, when the user uses the terminal to perform audio transmission to the BLUETOOTH headset, if a new BLUETOOTH headset is connected, prompt the user to choose whether to switch to the new BLUETOOTH headset to perform audio transmission, or when a current BLUETOOTH headset working mode is the exclusive mode, prompt the user to choose whether to switch the BLUETOOTH headset working mode, and if the user chooses to switch to the non-exclusive mode, further prompt the user to select BLUETOOTH headsets that simultaneously perform audio transmission, and if the user receives an incoming call when using the terminal to perform non-incoming call audio transmission to the BLUETOOTH headset, prompt the user to select at least one BLUETOOTH headset to answer the call.

It should be noted that, the receiving unit 100, the determining unit 200, the reading unit 300, the communications unit 400, and the prompting unit 500 may be separately disposed, or may be integrated. In addition, the receiving unit 100, the determining unit 200, the reading unit 300, the communications unit 400, or the prompting unit 500 in the terminal embodiment may be separated from a processor of the terminal in a hardware form, and may be disposed in a form of a microprocessor, or may be built in a processor of the terminal in a hardware form, or may be stored in a memory of the terminal in a software form such that the processor of the terminal invokes and performs operations corresponding to the receiving unit 100, the determining unit 200, the reading unit 300, the communications unit 400, and the prompting unit 500.

For example, in the second embodiment (the embodiment shown in FIG. 5) of the terminal according to the present disclosure, the communications unit 400 may be the processor of the terminal. Functions of the receiving unit 100, the determining unit 200, the reading unit 300, and the prompting unit 500 may be embedded in the processor, may be separated from the processor, or may be stored in the memory in a software form such that the processor invokes and implements the functions of the receiving unit 100, the determining unit 200, the reading unit 300, and the prompting unit 500. The processor may be a central processing unit (CPU), a microprocessor, a single-chip microcomputer, or the like.

Figure 6:
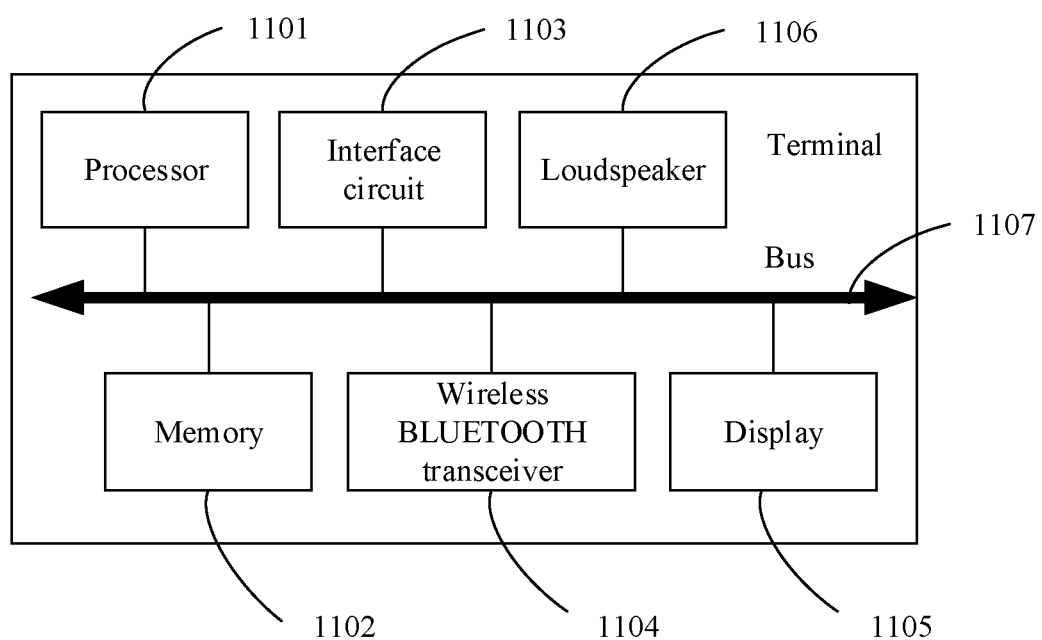
FIG. 6 is a schematic diagram of composition of a third embodiment of a terminal according to the present disclosure.

Referring to FIG. 6, FIG. 6 is a schematic diagram of composition of still another terminal according to an embodiment of the present disclosure. In this embodiment of the present disclosure, the terminal includes a processor 1101, a memory 1102, an interface circuit 1103, a wireless BLUETOOTH transceiver 1104, a display 1105, a loudspeaker 1106, and a bus 1107, where the processor 1101, the memory 1102, the interface circuit 1103, the wireless BLUETOOTH transceiver 1104, the display 1105, and the loudspeaker 1106 are connected and communicate with each other using the bus 1107, the wireless BLUETOOTH transceiver 1104 is configured to communicate with a BLUETOOTH headset using BLUETOOTH, the display 1105 is used for human computer interaction, and is configured to prompt a user to enter a selection instruction, the loudspeaker 1106 is configured to play sound, the memory 1102 is configured to store a set of program code, and the processor 1101 is configured to invoke the program code stored in the memory 1102 in order to perform the following operations when the user uses the terminal to perform audio transmission to the BLUETOOTH headset, receiving, using the display 1105 and the interface circuit 1103, a multi-BLUETOOTH-headset communication instruction entered by the user, determining whether a quantity of BLUETOOTH headsets currently connected to the terminal is greater than 1, if the quantity of BLUETOOTH headsets currently connected to the terminal is greater than 1, reading a BLUETOOTH headset working mode selected by the user, where the BLUETOOTH headset working mode includes an exclusive mode and a non-exclusive mode, and if the user selects the exclusive mode, creating, by the processor 1101, a headset tag object for a specified BLUETOOTH headset, establishing a communications link with the specified BLUETOOTH headset using the wireless BLUETOOTH transceiver 1104, and communicating with the specified BLUETOOTH headset using BLUETOOTH, or if the user selects the non-exclusive mode, separately creating, by the processor 1101, a headset tag object for all BLUETOOTH headsets, separately establishing a communications link with all the BLUETOOTH headsets using the wireless BLUETOOTH transceiver 1104, and simultaneously communicating, using BLUETOOTH, with more than one BLUETOOTH headset selected by the user, or communicating, using BLUETOOTH, with all the BLUETOOTH headsets with which the communications link is established.

The headset tag object includes information used to establish the communications link with the terminal.

Optionally, when the terminal establishes the communications link with the BLUETOOTH headset, the processor 1101 is further configured to send a reference COM model connection request to the BLUETOOTH headset using the interface circuit 1103, receive a response message returned by the BLUETOOTH headset, and establish a reference COM model connection to the BLUETOOTH headset according to the response message, and send, to the connected BLUETOOTH headset, a request for establishing a synchronous connection-oriented link, and establish the synchronous connection-oriented link with the connected BLUETOOTH headset.

Optionally, the processor 1101 is further configured to determine that there is a matched BLUETOOTH headset currently.

Optionally, if one BLUETOOTH headset is currently connected to the terminal, the processor 1101 is configured to create a headset tag object for the BLUETOOTH headset, establish a communications link with the BLUETOOTH headset using the wireless BLUETOOTH transceiver 1104, and communicate with the BLUETOOTH headset using BLUETOOTH.

Optionally, when the user uses the terminal to perform audio transmission to the BLUETOOTH headset, if a new BLUETOOTH headset is connected, the processor 1101 is configured to instruct the display 1105 to display prompt information in order to prompt the user to choose whether to switch to the new BLUETOOTH headset to perform audio transmission, or when a current BLUETOOTH headset working mode is the exclusive mode, prompt the user to choose whether to switch the BLUETOOTH headset working mode, and if the user chooses to switch to the non-exclusive mode, further prompt the user to select BLUETOOTH headsets that simultaneously perform audio transmission.

If the user receives an incoming call when using the terminal to perform non-incoming call audio transmission to the BLUETOOTH headset, the processor 1101 is configured to instruct the display 1105 to display prompt information in order to prompt the user to select at least one BLUETOOTH headset to answer the call.

It should be noted that the processor 1101 herein may be one processor or may be a collective term of multiple processing elements. For example, the processor may be a CPU, may be an application-specific integrated circuit (ASIC), or maybe one or more integrated circuits configured to implement this embodiment of the present disclosure.

The memory 1102 may be a storage apparatus, or may be a collective term of multiple storage elements, and is configured to store executable program code, or a parameter, data, or the like required by an access network device for running. In addition, the memory 1102 may include a random access memory (RAM), or may include a nonvolatile memory, such as a magnetic disk storage or a flash memory.

The bus 1107 may be classified into an address bus, a data bus, a control bus, and the like. For ease of representation, only one bold line is used in FIG. 6 to represent the bus, but it does not indicate that there is only one bus or one type of bus.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly, for related parts, reference may be made to partial descriptions in the method embodiment.

According to the description of the foregoing embodiments, the present disclosure has the following advantages When the user uses the terminal to perform audio transmission to the BLUETOOTH headset, the multi-headset communication mode of the terminal is enabled by receiving the multi-BLUETOOTH-headset communication instruction entered by the user, and then whether the quantity of BLUETOOTH headsets currently connected to the terminal is greater than 1 is determined. If the quantity of BLUETOOTH headsets currently connected to the terminal is greater than 1, the BLUETOOTH headset working mode selected by the user is read. If the user selects the exclusive mode, the terminal creates the headset tag object for the specified BLUETOOTH headset, establishes the communications link with the specified BLUETOOTH headset, and communicates with the specified BLUETOOTH headset using BLUETOOTH. Alternatively, if the user selects the non-exclusive mode, the terminal separately creates the headset tag object for all the BLUETOOTH headsets, separately establishes the communications link with all the BLUETOOTH headsets, and simultaneously communicates, using BLUETOOTH, with the more than one BLUETOOTH headset selected by the user, or simultaneously communicates, using BLUETOOTH, with all the BLUETOOTH headsets with which the communications link is established. Therefore, the terminal can accept association requests of at least two BLUETOOTH headset devices. When needing to perform BLUETOOTH communication, the terminal can simultaneously communicate with at least two BLUETOOTH headsets according to a user requirement such that a function and applicability of the terminal are expanded, use experience of the user is improved, and one or more users can use the terminal and multiple BLUETOOTH headsets according to a requirement of the one or more users.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a RAM, a magnetic disk, or an optical disc.

The foregoing describes in detail the BLUETOOTH communication method and the terminal provided in the embodiments of the present disclosure. In this specification, specific examples are used to describe the principle and implementations of the present disclosure, and the description of the embodiments is only intended to help understand the method and core idea of the present disclosure. In addition, a person of ordinary skill in the art may, based on the idea of the present disclosure, make modifications with respect to the specific implementations and the application scope. Therefore, the content of this specification shall not be construed as a limitation to the present disclosure.

What is claimed is:

1. A BLUETOOTH communication method implemented by a terminal, the BLUETOOTH communication method comprising:
   receiving a BLUETOOTH-headset communication instruction, wherein a quantity of BLUETOOTH headsets to be coupled to the terminal is greater than one;
   displaying a prompt for a user to switch a BLUETOOTH headset working mode of the terminal to a non-exclusive mode when the BLUETOOTH headset working mode is an exclusive mode and when a new BLUETOOTH headset is connected to the terminal;
   separately creating a headset tag object comprising address information, services available information, and main function information for each of the BLUETOOTH headsets;
   separately establishing, based on the headset tag object, a second communications link with each of the BLUETOOTH headsets; and
   simultaneously communicating with all connected BLUETOOTH headsets.

2. The BLUETOOTH communication method of claim 1, wherein the headset tag object comprises a synchronous connection-oriented link and an asynchronous connectionless link.

3. The BLUETOOTH communication method of claim 2, wherein the terminal simultaneously communicates with at least two of the BLUETOOTH headsets.

4. The BLUETOOTH communication method of claim 3, further comprising prompting the user to select at least one of the BLUETOOTH headsets to answer a call when the user receives an incoming call and the terminal is performing non-incoming call audio transmission to the BLUETOOTH headsets.

5. The BLUETOOTH communication method of claim 1, wherein the terminal comprises a wearable device.

6. The BLUETOOTH communication method of claim 1, wherein the terminal comprises an ANDROID operating system.

7. A terminal, comprising:
a memory configured to store instructions; and
one or more processors coupled to the memory and configured to execute the instructions to cause the terminal to:
communicate with a plurality of BLUETOOTH headsets using BLUETOOTH communications;
prompt a user to enter a selection instruction; play sound; receive a BLUETOOTH-headset communication instruction, wherein a quantity of the BLUETOOTH headsets to be coupled to the terminal is greater than one;
display a prompt for the user to switch a BLUETOOTH headset working mode of the terminal to a non-exclusive mode when the BLUETOOTH headset working mode is an exclusive mode and when a new BLUETOOTH headset is connected to the terminal;
separately create a headset tag object comprising address information, services available information, and main function information for each of the BLUETOOTH headsets;
separately establish, based on the headset tag object, a second communications link with each of the BLUETOOTH headsets; and
simultaneously communicate with all connected BLUETOOTH headsets.

8. The terminal of claim 7, wherein the headset tag object comprises a synchronous connection-oriented link and an asynchronous connection-less link.

9. The terminal of claim 8, wherein the one or more processors are further configured to simultaneously communicate with at least two of the BLUETOOTH headsets.

10. The terminal of claim 9, wherein the one or more processors are further configured to prompt the user to select at least one of the BLUETOOTH headsets to answer a call when the user receives an incoming call and the terminal is performing non-incoming call audio transmission to the BLUETOOTH headsets.

11. The terminal of claim 7, wherein the terminal comprises a wearable device.

12. A computer program product comprising computer-executable instructions stored on a non-transitory computer-readable medium that, when executed by one or more processors, cause a terminal to:
receive a BLUETOOTH-headset communication instruction, wherein a quantity of BLUETOOTH headsets to be coupled to the terminal is greater than one;
display a prompt for a user to switch a BLUETOOTH headset working mode of the terminal to a non-exclusive mode when the BLUETOOTH headset working mode is an exclusive mode and when a new BLUETOOTH headset is connected to the terminal;
separately create a headset tag object comprising address information, services available information, and main function information for each of the BLUETOOTH headsets;
separately establish, based on the headset tag object, a second communications link with each of the BLUETOOTH headsets; and
simultaneously communicate with all connected BLUETOOTH headsets.

13. The computer program product of claim 12, wherein the headset tag object comprises a synchronous connection-oriented link and an asynchronous connection-less link.

14. The computer program product of claim 13, wherein the terminal simultaneously communicates with at least two of the BLUETOOTH headsets.

15. The computer program product of claim 14, wherein the instructions further cause the terminal to prompt the user to select at least one of the BLUETOOTH headsets to answer a call when the user receives an incoming call and the terminal is performing non-incoming call audio transmission to the BLUETOOTH headsets.

16. The computer program product of claim 12, wherein the terminal comprises an ANDROID operating system.

17. The computer program product of claim 12, wherein the terminal comprises a WINDOWS operating system.

18. The computer program product of claim 12, wherein the terminal comprises an IOS operating system.

19. The computer program product of claim 12, wherein the terminal comprises a wearable device.

20. The computer program product of claim 12, wherein the terminal comprises a mobile device.

* * * * *